(12) United States Patent
Biro et al.

(10) Patent No.: US 6,261,696 B1
(45) Date of Patent: Jul. 17, 2001

(54) OPTICAL ELEMENT WITH SUBSTRATE CONTAINING FLUORITE AS MAIN INGREDIENT, AND METHOD AND APPARATUS FOR PRODUCING THE OPTICAL ELEMENT

(75) Inventors: Ryuji Biro, Kawasaki; Minoru Otani, Tokyo; Kenji Ando, Kawasaki; Yasuyuki Suzuki, Yokohama; Hidehiro Kanazawa, Tokyo, all of (JP)

(73) Assignee: Canon Kabushika Kaisha, Tokyo (JP)

( * ) Notice: Subject to any disclaimer, the term of this patent is extended or adjusted under 35 U.S.C. 154(b) by 0 days.

(21) Appl. No.: 08/819,817

(22) Filed: Mar. 18, 1997

(30) Foreign Application Priority Data

Mar. 22, 1996 (JP) .................................................. 8-093536

(51) Int. Cl.[7] .............................. B32B 9/00; B32B 17/06
(52) U.S. Cl. .......................... 428/428; 428/426; 428/446; 428/448

(58) Field of Search ....................................... 428/446, 448, 428/426, 428

(56) References Cited

FOREIGN PATENT DOCUMENTS

| 4-228560 | 8/1992 | (JP) | ................. | C23C/14/08 |
|---|---|---|---|---|
| 5-188203 | 7/1993 | (JP) | ................. | G02B/1/10 |
| 7-218701 | 8/1995 | (JP) | ................. | G02B/1/11 |
| 7-261002 | 10/1995 | (JP) | ................. | G02B/1/11 |
| 8-220304 | 8/1996 | (JP) | ................. | G02B/1/11 |

*Primary Examiner*—Deborah Jones
*Assistant Examiner*—Lymarie Miranda
(74) *Attorney, Agent, or Firm*—Fitzpatrick, Cella, Harper & Scinto

(57) ABSTRACT

A film formation method of forming at least one layered film on a substrate containing fluorite as a main ingredient by using a film formation apparatus which emits electrons or ions, which comprises the step of forming, as a first layered film counted from the side of the substrate, a film having a thickness of 30 nm or less and comprising at least one selected from the group consisting of $SiO_2$, BeO, MgO, and $MgF_2$.

14 Claims, 10 Drawing Sheets

REFLECTANCE CHARACTORISTICS OF SAMPLES C AND D

OPTICAL ELEMENT WITH SUBSTRATE CONTAINING FLUORITE AS MAIN INGREDIENT, AND METHOD AND APPARATUS FOR PRODUCING THE OPTICAL ELEMENT

BACKGROUND OF THE INVENTION

1. Field of the Invention

The present invention relates to an optical element for constituting an optical system using ultraviolet light, particularly KrF excimer laser light, ArF excimer laser light or the like, and also to a method and apparatus for producing such an optical element.

2. Related Background Art

Light in an ultraviolet region is conventionally used in optical apparatus such as a projection light-exposure apparatus for use in semiconductor device production. As a laser for generating light with a wavelength of 250 nm or less, lasers such as KrF, KrCl, ArF, ArCl, $Xe_2$, $Kr_2$, $Ar_2$, and $F_2$ lasers are available. Fluorite exhibits a high transmission in the ultraviolet region, and is widely used to constitute optical elements such as a mirror, lens, beam splitter, etc., which constitute an optical system used in a projection light-exposure apparatus.

For example, Japanese Patent Application Laid-Open Nos. 7-261002, 7-218701, and 8-220304, disclose a structure of antireflection film suitable for an optical element. In the optical element for use in a KrF excimer laser, a multilayer is used as an antireflection film, the multilayer comprising aluminum oxide layers having a high refractive index and silicon oxide layers having a low refractive index and being produced by forming the aluminum oxide film first on and in contact with the surface of a quartz substrate, then the silicon oxide film thereon, and further alternately forming the aluminum oxide films and the silicon oxide films.

An optical element for use in shorter-wavelength laser devices such as an ArF excimer laser has been attempted to be produced from fluorite (calcium fluoride) as a substrate material.

However, when an optical element is produced by forming a multilayer film on a fluorite substrate by means of for example sputtering, color centers are generated. As a result, desired spectral characteristics cannot be obtained. Japanese Patent Application Laid-Open Nos. 4-228560 and 5-188203 disclose optical elements in which a 52.0 nm thick silicon oxide film is first formed on a fluorite substrate and then aluminum oxide and silicon oxide films are successively formed thereon, or in which a 62 nm thick silicon oxide film is first formed on a fluorite substrate and then magnesium oxide and silicon oxide films are successively formed thereon.

However, color centers are also generated even in the optical elements produced by these techniques, and thus desired spectral characteristics cannot be obtained.

SUMMARY OF THE INVENTION

It is an object of the present invention to provide an optical element without generating no color centers and with a desired spectral characteristic by using a fluorite substrate and suitably determing the material and thickness of the layer adjacent to the fluorite substrate.

It is another object of the present invention to provide a method and apparatus for forming a film on a fluorite substrate without causing degradation in the characteristics of the fluorite substrate and without generating color centers thereby achieving a desired spectral characteristic.

It is still another object of the present invention to provide an optical element comprising a plurality of films stacked on a fluoride substrate in which a film in contact with and on the substrate is a film having a thickness of 30 nm or less and comprising at least one selected from the group consisting of silicon oxide, beryllium oxide, magnesium oxide, and magnesium fluoride; and to provide a light-exposure apparatus using such an optical element.

(1-1) According to an aspect of the present invention, there is provided a film formation method of forming at least one layered film on a substrate containing fluorite as a main ingredient by using a film formation apparatus which emits electrons or ions, which comprises the step of forming, as a first layered film counted from the side of the substrate, a film having a thickness of 30 nm or less and comprising at least one selected from the group consisting of $SiO_2$, $BeO$, $MgO$, and $MgF_2$.

(1-1-1) Preferably, the thickness of the first layered film is 5 nm or more.

(1-1-2) Furthermore, the first layered film is preferably such a film comprising $SiO_2$, and the method preferably further comprises the step of forming a film comprising $Al_2O_3$ serving as a second layered film.

(1-1-3) Preferably, the method comprises the step of alternately forming a film comprising $SiO_2$ and a film comprising $Al_2O_3$ to form third and upper layered films.

(1-1-4) Still preferably, the method comprises the steps of: forming films comprising $SiO_2$ serving as third, fifth and seventh layered films, respectively; and forming films comprising $Al_2O_3$ serving as fourth and sixth layered films, respectively, thereby obtaining a multilayered film having the function of antireflection.

(1-1-5) The above multilayered film preferably has the function of antireflection at a wavelength of 193 nm.

(1-1-6) The above film formation apparatus which emits electrons or ions preferably utilizes a vacuum evaporation technique to melt a film material by means of an electron beam.

(1-1-7) Furthermore, the above film formation apparatus which emits electrons or ions preferably utilizes a sputtering technique to sputter a film material.

(1-2) According to another aspect of the present invention, there is provided a film formation method of forming a film on a substrate containing fluorite as a main ingredient by using a film formation apparatus which emits electrons or ions, which comprises the step of forming, as a first layered film counted from the side of the substrate, a film comprising at least one selected from the group consisting of $SiO_2$, $BeO$, $MgO$, and $MgF_2$ by a film formation apparatus which emits neither electrons nor ions.

(1-2-1) Preferably the above film formation apparatus which emits electrons or ions utilizes a vacuum evaporation technique to melt a film material by means of an electron beam.

(1-2-2) Furthermore, the film formation apparatus which emits electrons or ions preferably utilizes a sputtering technique to sputter a film material.

(1-2-3) Preferably, the film formation apparatus which emits neither electrons nor ions utilizes a resistance heating technique to melt a film material.

(1-3) According to still another aspect of the present invention, there is provide a film formation method of forming a film at a plurality of positions on a substrate containing fluorite as a main ingredient by using a film formation apparatus which emits electrons or ions, which comprises the step of forming a film, as a first layered film counted from the side of the substrate, at the plurality of positions on the substrate by using a film formation apparatus which emits neither electrons nor ions, the first layered film comprising at least one selected from the group consisting of $SiO_2$, BeO, MgO, and $MgF_2$.

(2-1) According to a further aspect of the present invention, there is provided a film formation apparatus which emits electrons or ions and is capable of forming a film at a plurality of positions on a substrate containing fluorite as a main ingredient, which comprises a shielding means for blocking the electrons or ions so that when the film is formed at a predetermined position of the plurality of positions, the plurality of positions other than the predetermined position are protected from the incidence of the electrons or ions.

(2-1-1) Preferably, the film formation apparatus which emits electrons or ions utilizes a vacuum evaporation technique to melt a film material by means of an electron beam.

(2-1-2) Furthermore, the film formation apparatus which emits electrons or ions preferably utilizes a sputtering technique to sputter a film material.

DETAILED DESCRIPTION OF THE PREFERRED EMBODIMENT

FIGS. 1A to 1F are cross-sectional views illustrating examples of optical elements according to the present invention.

Figure 1A:
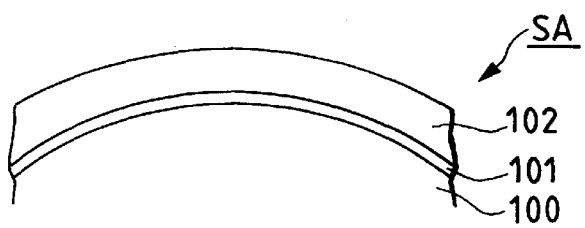
FIGS. 1A, 1B, 1C, 1D, 1E and 1F are cross-sectional views illustrating optical elements according to the present invention.

FIG. 1A illustrates an optical element SA serving as a lens. The lens is composed of a calcium fluoride substrate 100, a film (under-coat film) 101 having a thickness of 30 nm or less, and an antireflection film 102.

Figure 1B:
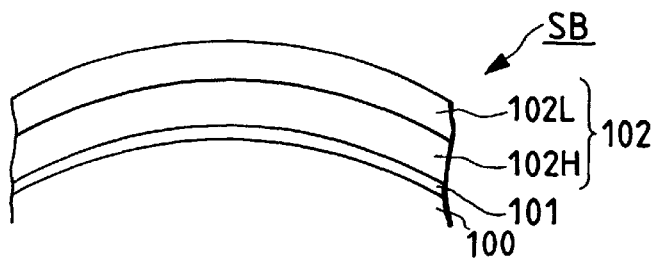

FIG. 1B illustrates a lens SB with an antireflection film 102 consisting of a film 102L having a low refractive index and a film 102H having a high refractive index.

Figure 1C:
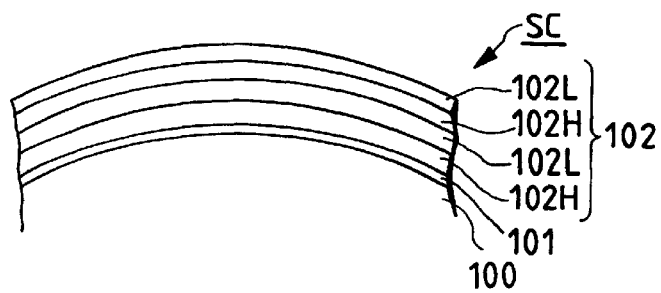

FIG. 1C illustrates a lens SC with an antireflection film 102L having a four-layered structure consisting of films 102L having a low refractive index and films 102H having a high refractive index superposed alternately.

Figure 1D:
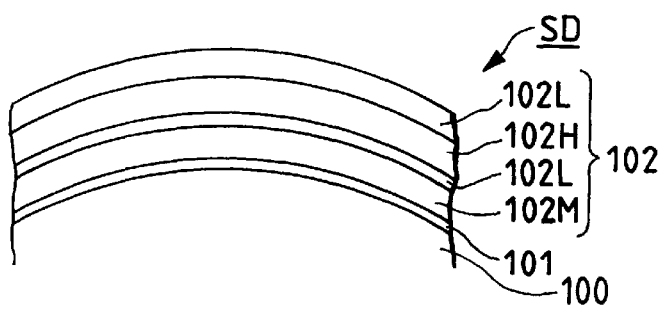

FIG. 1D illustrates a lens SD which is obtained by modifying the structure SC in such a manner that the film 102H in contact with the under-coat film 101 is replaced by a film 102M having an intermediate refractive index.

Figure 1E:
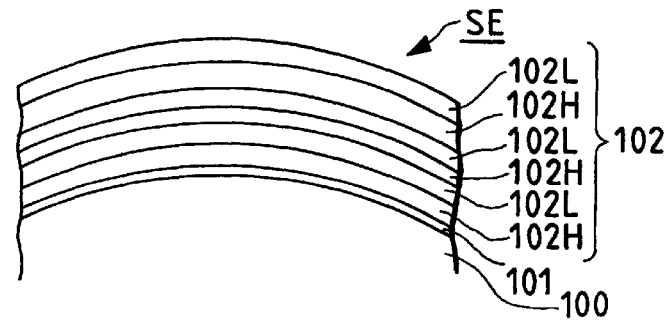

FIG. 1E illustrates a lens SE with an antireflection film 102 having a six-layered structure consisting of films 102L and films 102H superposed alternately.

Figure 1F:
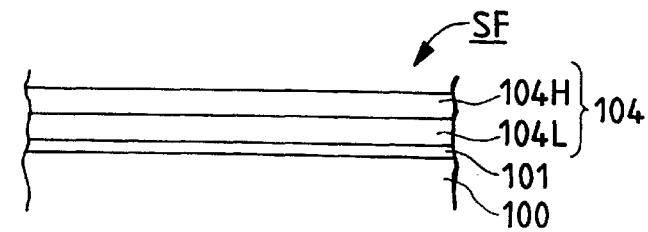

FIG. 1F illustrates a mirror SF with a reflection enhancement film 104 including a film 104H having a high refractive index located at an outermost position.

In the present invention, as described above, an under-coat film is formed in contact with the surface of a fluoride substrate to thereby reduce damage which the fluoride substrate encounters during formation of the film 102 or 104. The under-coat film also serves to improve the adhesion between the fluoride substrate and the film 102 or 104.

Furthermore, the presence of the under-coat film 101 allows the upper layered films to be formed by using a film formation apparatus such as a sputtering apparatus which emits electrons or ions. This type of film formation apparatus can provide a high film deposition rate, and thus it is possible to produce optical elements at low cost.

In the present invention, the under-coat film preferably comprises at least one selected from silicon oxide, beryllium oxide, magnesium oxide, and magnesium fluoride. It is also preferable that the thickness of the under-coat film is 30 nm or less, and more preferably within the range of from 5 nm to 30 nm.

Figure 2:
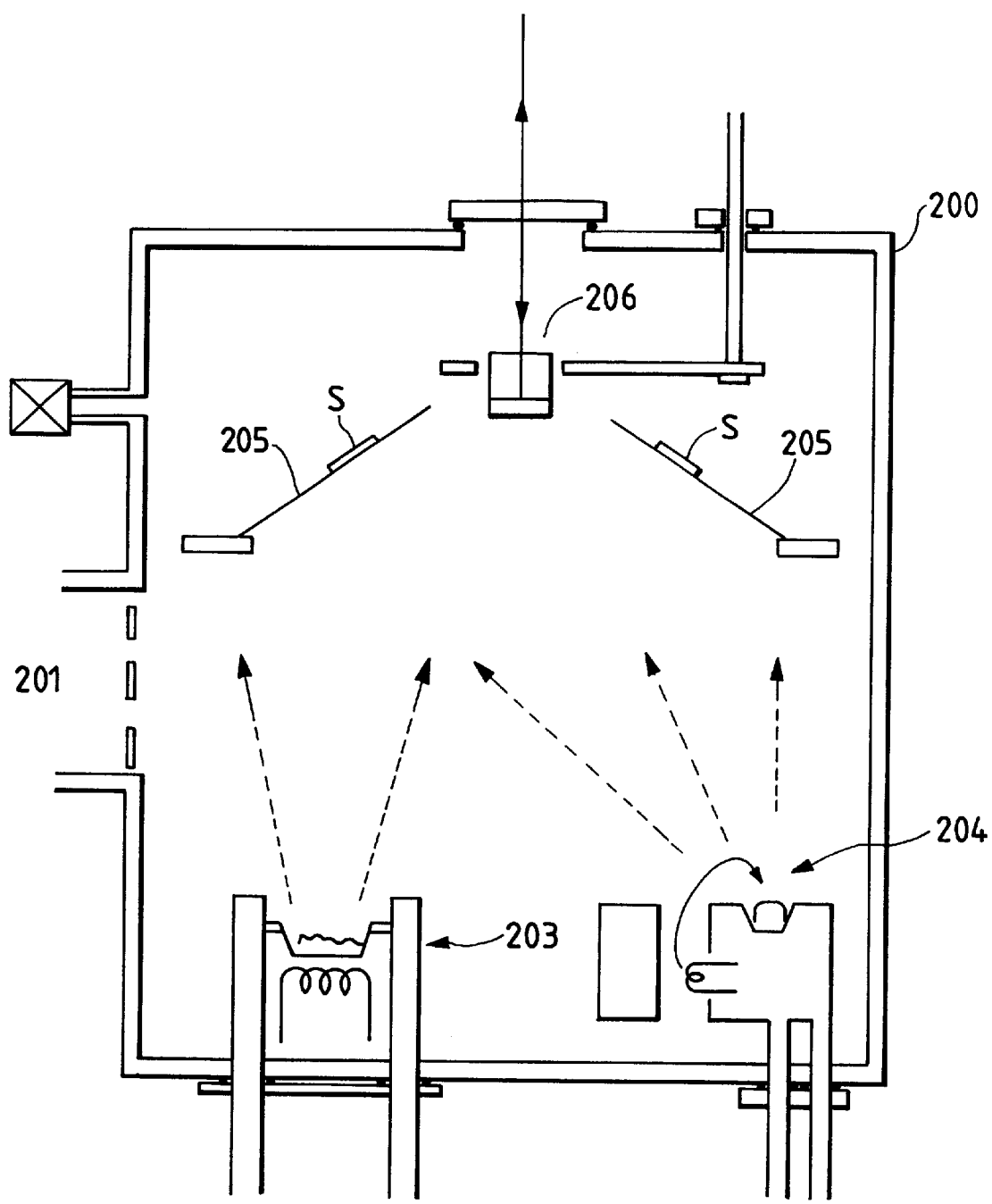
FIG. 2 is a schematic diagram illustrating the principal parts of a film formation apparatus according to the present invention.

FIG. 2 illustrates a film formation apparatus suitable to produce an optical element according to the present invention.

As shown in FIG. 2, the apparatus comprises a reaction chamber 200; an exhaust port 201; resistance heating evaporation source 203 for evaporating a starting material in a crucible; an electron beam evaporation source 204 for evaporating a material with an electron beam; a substrate holder 205 for holding a fluoride substrate S; and a film thickness monitor 206 for optically measuring the thickness of a film being formed.

In the present invention, a starting material for an under-coat film is placed in the crucible of the resistance heating evaporation source 203, and heated by means of resistance heating so that silicon oxide, beryllium oxide, or magnesium oxide is deposited on the surface of a substrate S placed above the evaporation source 203. The film thickness is monitored by the film thickness monitor, and the film formation is stopped before the monitored thickness exceeds 50 nm so that the thickness of the obtained film becomes 50 nm or less.

After that, thin films are superposed thereon by means of electron beam evaporation.

In the present embodiment, as the film adjacent to the fluorite substrate, a film containing at least one selected from $SiO_2$, BeO, MgO, and $MgF_2$ is formed and therefore the formed film can effectively prevent color centers from being generated in the fluorite substrate.

Furthermore, in the present embodiment, a material such as $SiO_2$ and $MgF_2$ having a refractive index close to that of the fluorite substrate is employed to form a film as the film adjacent to the fluorite substrate, thereby ensuring that the film can be formed without causing a great change in the optical characteristics.

Figure 3:
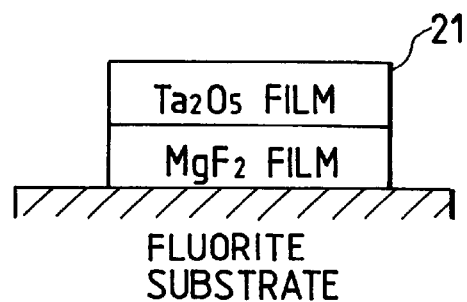
FIG. 3 is a cross-sectional view illustrating the principal parts of an optical element having a film according to the present invention.
Figure 4:
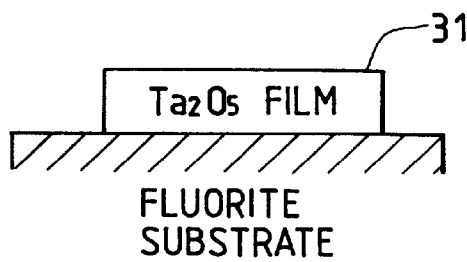
FIG. 4 is a cross-sectional view illustrating the principal parts of an optical element having a film.

FIG. 3 is a schematic diagram illustrating an optical element 21 (sample A) having $MgF_2$ and $Ta_2O_5$ films formed on a fluorite substrate according to a first embodiment of the present invention, wherein the films are deposited by using the film formation apparatus shown in FIG. 2. For comparison, an optical element 31 (sample B) having only a $Ta_2O_5$ film formed on a fluorite substrate is shown in FIG. 4.

In FIG. 3, $MgF_2$ was heated by using the resistance heating evaporation source 203 to deposit the $MgF_2$ film on the fluorite substrate, and $Ta_2O_5$ was then heated with an electron beam generated from the electron beam evaporation source 204 to deposit the $Ta_2O_5$ film. The two types of optical elements 21 and 31 were evaluated in terms of the color centers and the adhesion between the substrate and the films. The result is shown in Table 1.

The color centers in the fluorite substrates were evaluated by measuring the absorption at wavelengths near 500 nm. The film adhesion was evaluated by testing whether the films were peeled or not when they were scrubbed strongly. As can be apparently seen from Table 1, the optical element shown in FIG. 3, having the films formed according to the present invention, are better than the optical element shown in FIG. 4 in both optical and mechanical characteristics.

TABLE 1

|  | Sample A | Sample B |
| --- | --- | --- |
| Color Center | Not detected | Detected |
| Adhesion | Good | Poor |

In the above specific example, the film formed in direct contact with and on the fluorite substrate was composed of $MgF_2$. When, $SiO_2$, BeO, or MgO also was employed, the same effect was obtained.

Figure 5:
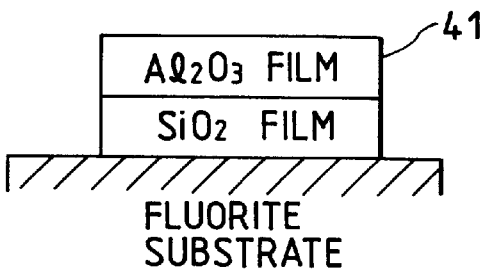
FIG. 5 is a cross-sectional view illustrating the principal parts of an optical element having a film according to the present invention.
Figure 6:
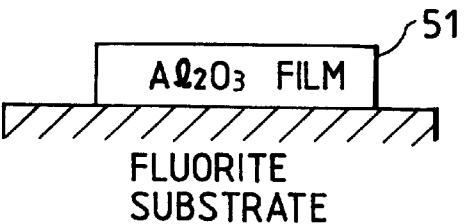
FIG. 6 is a cross-sectional view illustrating the principal parts of an optical element having a film.

FIG. 5 is a schematic diagram illustrating an optical element 41 (sample C) having $SiO_2$ and $Al_2O_3$ films deposited successively on a fluorite substrate according to a second embodiment of the present invention. For comparison, a conventional optical element 51 (sample D) having only an $Al_2O_3$ film formed on a fluorite substrate is shown in FIG. 6. The above two types of optical elements were evaluated in terms of the absorption at a wavelength of 193 nm, the presence of color centers, and the adhesion. The result is shown in Table 2.

In the above evaluation, the absorption at 193 nm was determined by subtracting the sum of the transmittance and reflectance components detected in spectrometry measurement from the 100% value. The color centers were evaluated by measuring the absorption at wavelengths near 500 nm. The film adhesion was evaluated by testing whether the films were peeled or not when they were scrubbed strongly.

TABLE 2

|  | Sample C | Sample D |
| --- | --- | --- |
| Absorption (at 193 nm) | 1% | 12% |
| Color Center | Not detected | Detected |
| Adhesion | Good | Poor |

As can be apparently seen from Table 2, the optical element shown in FIG. 5, having the films formed according to the present invention, are better than the optical element shown in FIG. 6 in both optical and mechanical characteristics.

Figure 7:
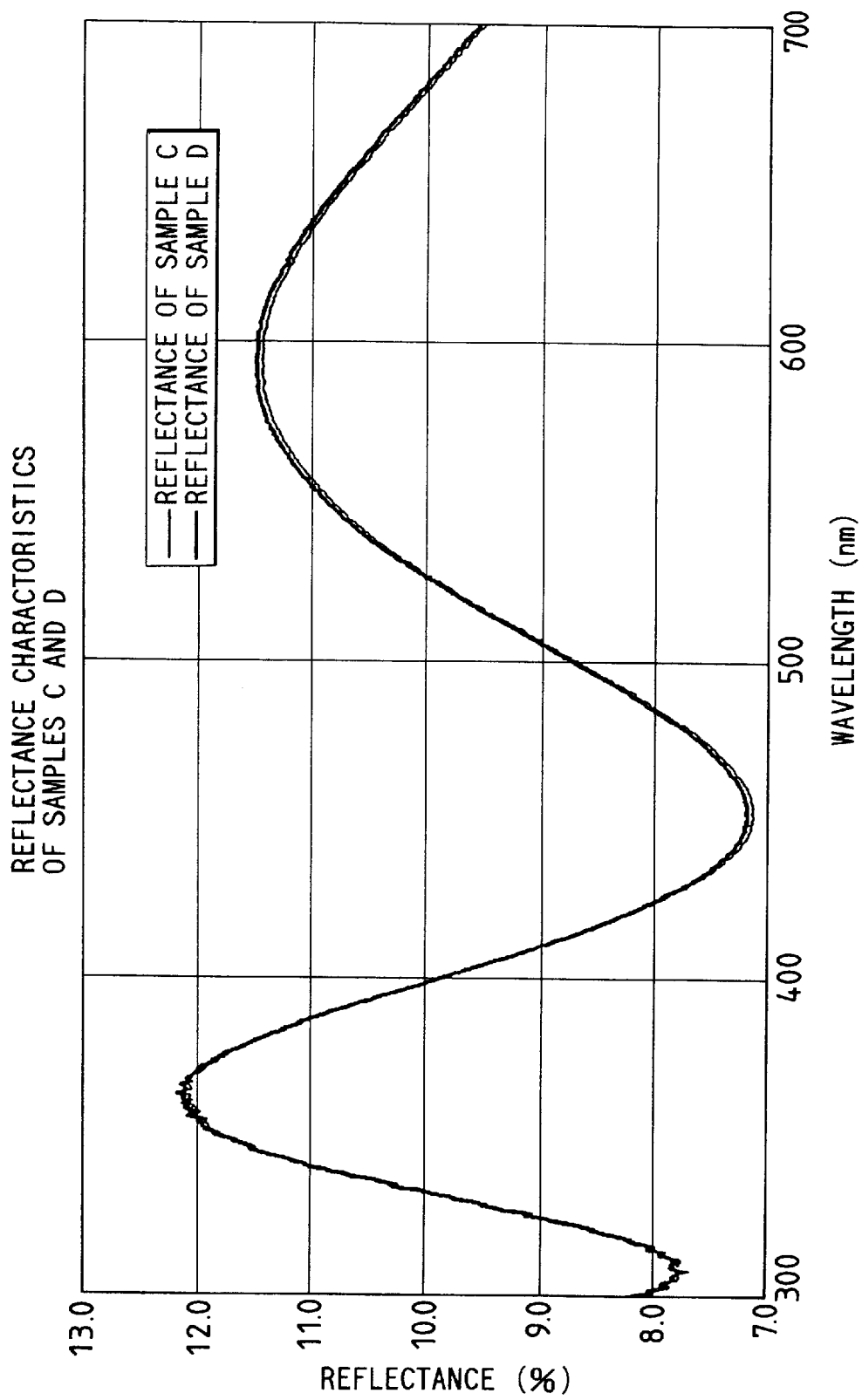
FIG. 7 is a graph illustrating the reflectance characteristics of the optical elements shown in FIG. 5 and 6.
Figure 8:
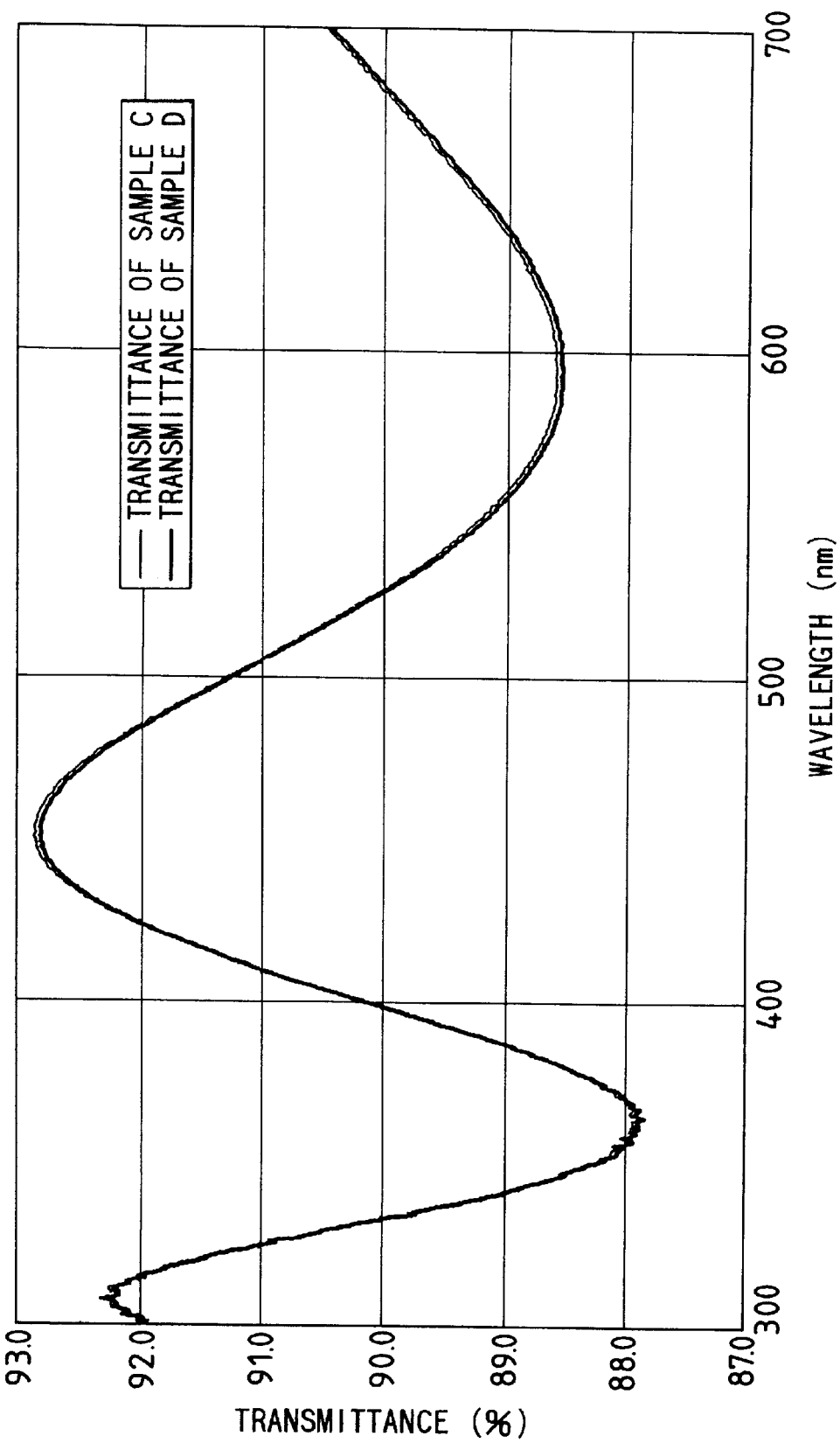
FIG. 8 is a graph illustrating the transmission characteristics of the optical elements shown in FIG. 5 and 6.

FIG. 7 is a graph showing the reflectance characteristics of the sample C shown in FIG. 5, having 10 nm thick $SiO_2$ film and 270 nm thick $Al_2O_3$ film formed on the fluorite substrate according to the third embodiment of the present invention, and of the sample D shown in FIG. 6, having the 270 nm thick $Al_2O_3$ formed on the fluorite substrate. FIG. 8 is a graph showing the transmittance characteristics for these samples C and D.

As can be apparently seen from FIGS. 7 and 8, both samples are substantially equal in the optical characteristics. This means that the presence of the $SiO_2$ film does not cause a change in the optical characteristics as long as its thickness is limited to the range equal to the above thickness.

The absorption at 193 nm wavelength, the color centers, and the adhesion evaluated for the third embodiment sample with the $SiO_2$ film having a thickness in the above range were substantially the same as those of the sample according to the second embodiment.

Next, a fourth embodiment of an optical element according to the present invention will be described below. In this fourth embodiment, a multilayered film having an antireflection characteristic to 193 nm wavelength light of an ArF laser was produced by successively depositing $SiO_2$, $Al_2O_3$, $SiO_2$, $Al_2O_3$, $SiO_2$, $Al_2O_3$, and $SiO_2$ films on a fluorite substrate so that the films have refractive indices and optical thicknesses shown in Table 3.

Figure 9:
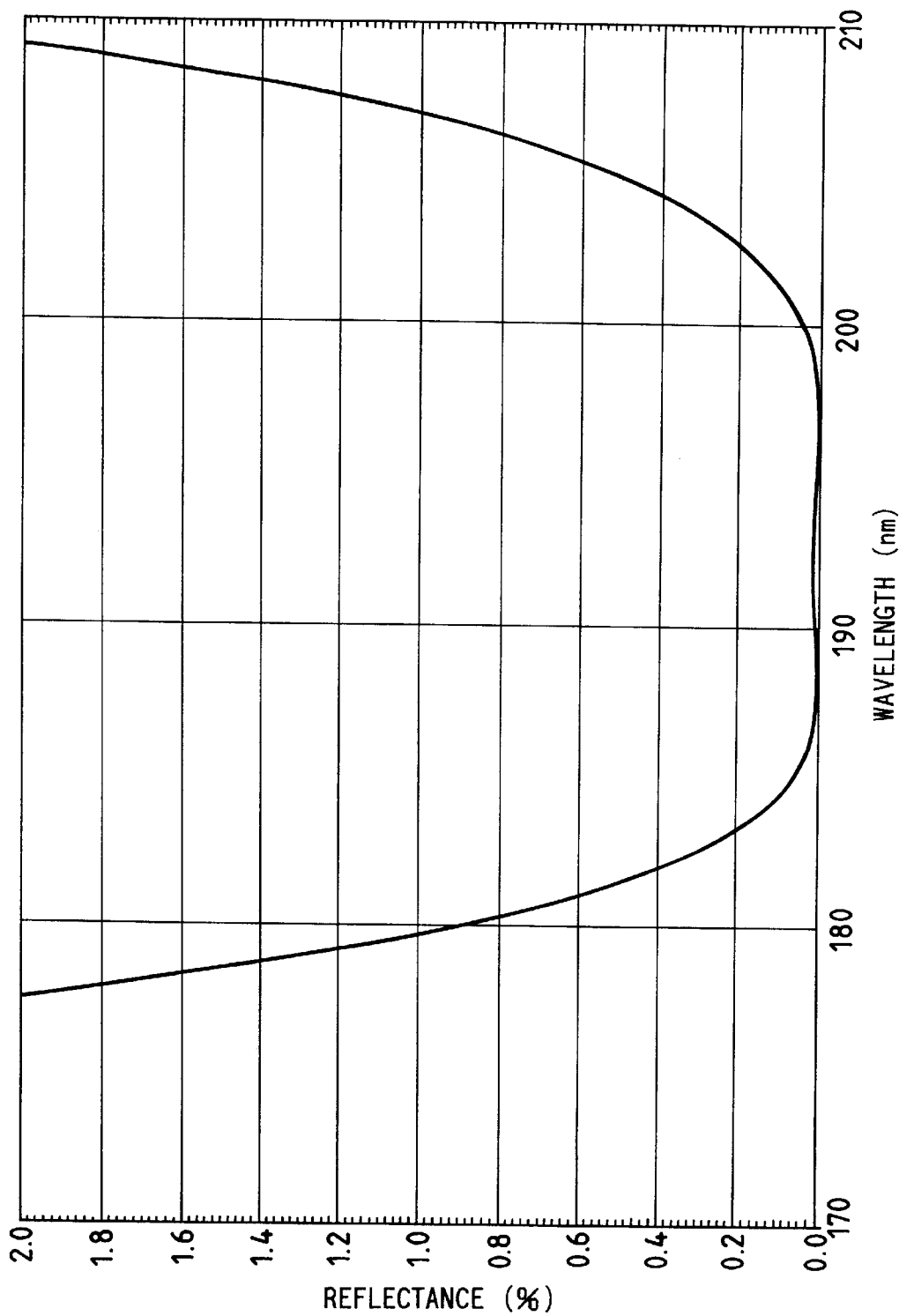
FIG. 9 is a graph illustrating the reflectance characteristic of an optical element according to a fourth embodiment of the present invention.

FIG. 9 illustrates the reflectance characteristics measured for the sample produced according to the fourth embodiment. In Table 3, the refractive indices were measured at a wavelength of 193 nm, and the optical thicknesses are each represented by (refractive index of material)×(mechanical thickness).

As can be seen from FIG. 9, the antireflection film having good reflectance characteristics of 0.1% or less at a wavelength of 193 nm was formed on the fluorite substrate in this embodiment. In the sample with this antireflection film, no color centers were detected in the fluorite substrate, and excellent adhesion was obtained.

TABLE 3

|  | Material | Refractive index | Optical thickness |
| --- | --- | --- | --- |
| Incident medium | Air | 1.000 |  |
| 7th layer | $SiO_2$ | 1.561 | 47.0 |
| 6th layer | $Al_2O_3$ | 1.819 | 49.0 |
| 5th layer | $SiO_2$ | 1.561 | 46.0 |
| 4th layer | $Al_2O_3$ | 1.819 | 45.4 |
| 3rd layer | $SiO_2$ | 1.561 | 55.0 |
| 2nd layer | $Al_2O_3$ | 1.819 | 82.1 |
| 1st layer | $SiO_2$ | 1.561 | 15.6 |
| Substrate | Fluorite | 1.536 |  |

Figure 10:
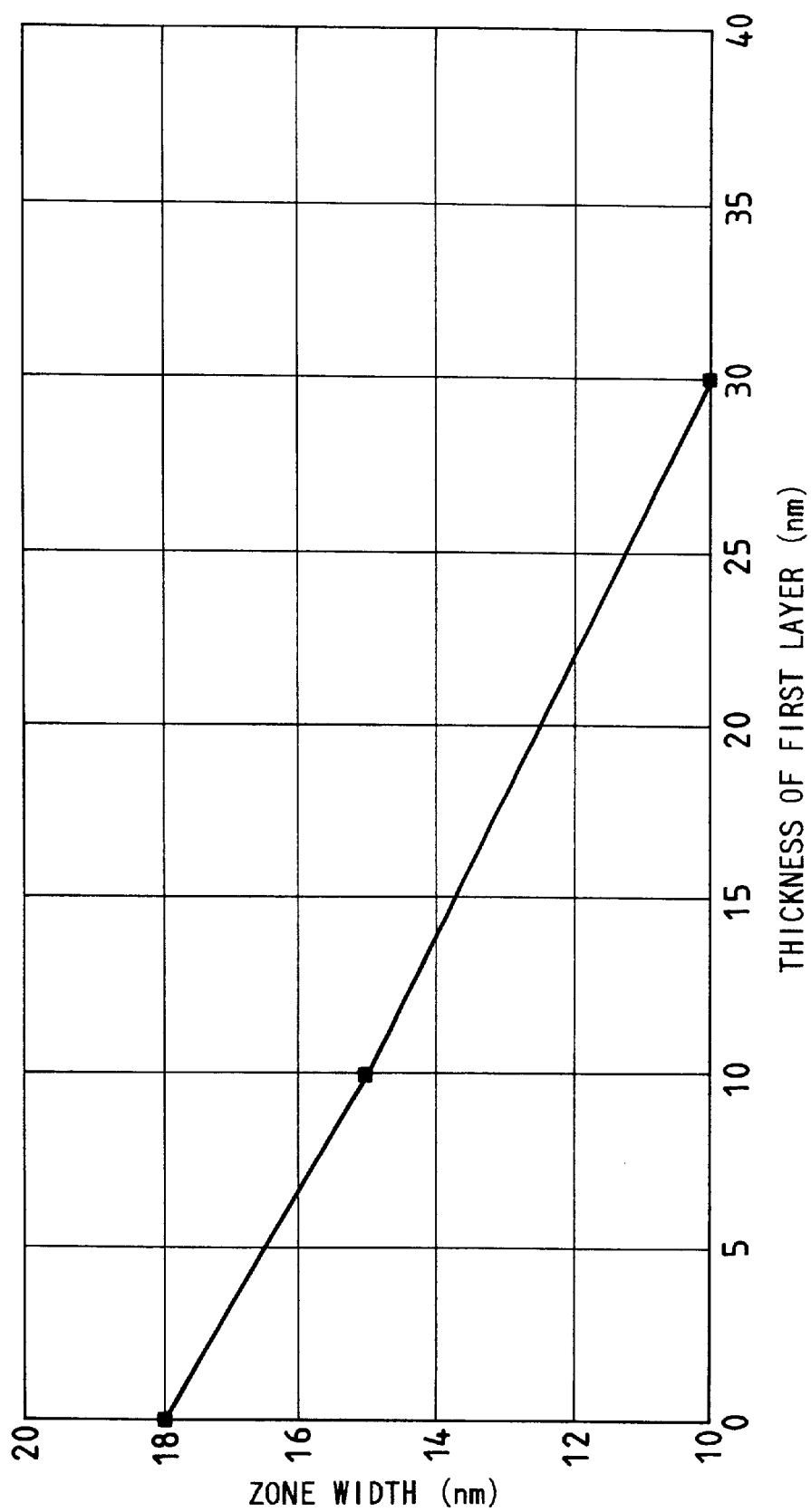
FIG. 10 is a graph illustrating the effect of the thickness of a first layered film according to a fifth embodiment of the present invention.

FIG. 10 illustrates the relationship between the thickness of the first layer of the antireflection film according to this embodiment and the width of the wavelength zone in which the antireflection film has a reflectance of 0.1% or less. As can be seen from FIG. 10, when the thickness of the first layer is set to 30 nm or more, the zone satisfying the low reflectance of 0.1% or less becomes as narrow as 10 nm or less, and thus the antireflection characteristic is not good enough in practical applications. Thus, it is desirable that the thickness of the first layer be 30 nm or less. On the other hand, although the thickness of the first layer is 5 nm, color centers are not generated in a fluorite substrate, color centers are observed when the thickness of the first layer is less than 5 nm. From this point, it is desirable that the thickness of the first layer be 5 nm or more. In conclusion, the thickness of the first layer is selected within the range of from 5 nm to 30 nm in this embodiment.

In this embodiment, as described above, an $SiO_2$ film serving as the first layered film is formed on a fluorite substrate within the range of from 5 nm to 30 nm. Since the thickness is very thin, it is possible to form the film in a short time without causing film separation and color centers.

According to this embodiment, it is possible to obtain an optical element having refractive index similar to that of a fluorite substrate. That is, it is possible to form films on the optical element without causing a change in the optical characteristics.

Figure 11:
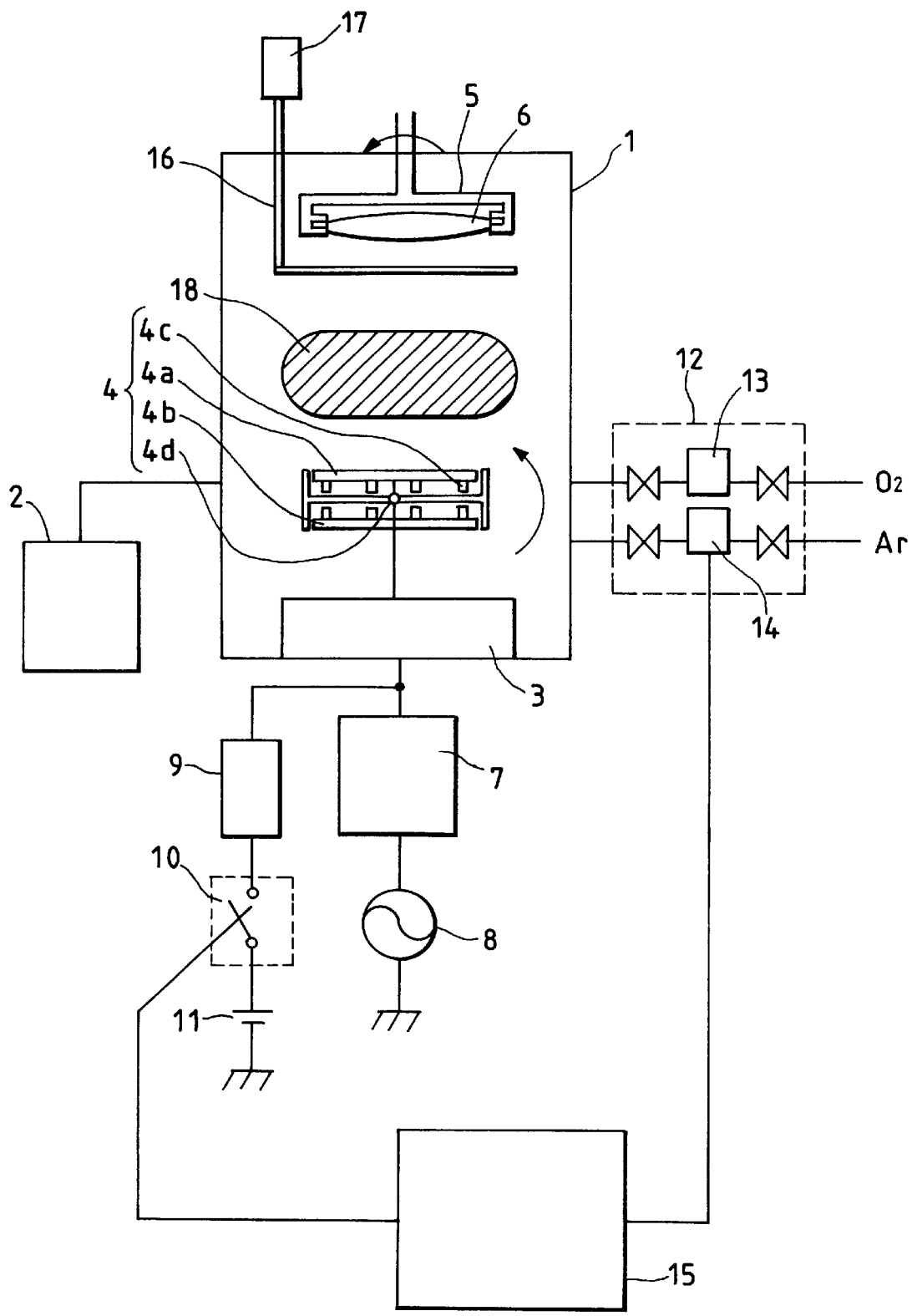
FIG. 11 is schematic diagram illustrating the principal parts of a film formation apparatus according to the present invention.

FIG. 11 is a schematic diagram illustrating principal parts of a film formation apparatus according to the present invention. This apparatus is designed to form a desired film on a fluorite substrate by means of sputtering. As shown in FIG. 11, there is provided a vacuum chamber 1 comprising an evacuating system 2 for evacuating the inside of the vacuum chamber 1, a gas supplying system 12 for supplying various gases into the vacuum chamber 1, and a shutter driving mechanism 17 for driving a shutter plate 16 disposed inside the vacuum chamber 1. Inside the vacuum chamber 1, there are also provided a cathode electrode 3 and a substrate holder 5 for holding a substrate (fluorite substrate) 6 at a position opposite to the cathode electrode 3. The substrate holder 5 has a mask member for covering the surface area of the substrate other than the area where a film is to be formed.

A target holder 4 is attached to the cathode electrode 3. The target holder 4 holds target materials such as an aluminum target 4a and an $SiO_2$ target 4b in such a manner that the target materials can be rotated about the rotation axis 4d. Magnets 4c are attached to the targets 4a and 4b. The substrate holder 5 also has a mechanism for heating the substrate 6. The shutter plate 16 is disposed below the substrate 6 so that the timing of forming a thin film (such as a $SiO_2$ or aluminum oxide film) on the substrate 6 is controlled by the shutter plate 16.

The cathode electrode 3 is connected to a high frequency power supply 8 via a matching box 7 for controlling the discharging impedance. The cathode electrode 3 is also connected to one end of a switch 10 via a low-pass filter 9 for cutting high frequency components of electric power from the high frequency power supply 8. The other end of the switch 10 is connected to a DC power supply 11.

The gas supplying system 12 is piped to bombs of oxygen ($O_2$) gas serving as a reaction gas and Ar gas serving as a sputtering gas via mass flowmeters 13 and 14 for controlling the flow rate of these gases. The switch 10 and the mass flowmeter 14 for controlling the flow of argon gas are connected to a controller 15 so that they are controlled by the controller 15.

In this embodiment, the $SiO_2$ target 4b is set first so that it faces the substrate 6.

Then the inside of the vacuum chamber 1 is sufficiently evacuated via the evacuation system 2. Oxygen ($O_2$) gas is then supplied at a flow rate of 100 sccm into the vacuum chamber via the mass flowmeter 13 of the gas supply system 12. High frequency electric power of 400 W is supplied from the high frequency power supply 8 to the cathode electrode 3 and the $SiO_2$ target 4b via the matching box 7, thereby generating plasma 18. The high frequency electric power is adjusted to a predetermined value while adjusting the impedance via the matching box 7 so that reflected high frequency wave is minimized. Presputtering is then performed so as to clean the surface of the target 4b and stabilize discharging. After completion of the presputtering, the shutter plate 16 is opened by the shutter driving mechanism 17 and formation of a thin film on the substrate is started.

When formation of $SiO_2$ onto the substrate is completed, the shutter plate 16 is closed. The target holder 4 is then rotated so that the aluminum target 4a comes to a position facing the substrate 6. In the same manner as in formation of the $SiO_2$ film, while oxygen ($O_2$) gas is supplied at a flow rate of 150 sccm into the vacuum chamber, high frequency electric power of 2000 W and DC power of 200 W are applied to the aluminum target 4a, thereby depositing an $Al_2O_3$ film on the substrate 6.

The fluorite substrate 6 having the thin film formed thereon by the above process according to this embodiment was taken out, and evaluated in terms of whether color centers were generated or not. The result has revealed that when the fluorite substrate whose back face is protected by a cover during the film formation process, no color centers are generated.

In this embodiment, when a film is deposited at a plurality of positions (on both surfaces) of a fluorite substrate by means of sputtering or an ion-beam, an $SiO_2$ film is first deposited over the entire surface by using a resistance heating evaporation source such as that shown in FIG. 2. This ensures that the fluorite substrate is not exposed directly to plasma (electrons, ions), and thus is not damaged by plasma. Thus, no color centers are generated.

According to the present invention, as described above, a film adjacent to a fluorite substrate is formed by suitably determining the material and thickness of the film to obtain a film without causing a change in the optical characteristics of the fluorite substrate and without generating color centers. Therefore, it is possible to easily achieve a method and apparatus for forming a film in which a film having desired spectral characteristics are easily obtained.

Light Exposure Apparatus

A light exposure apparatus using an optical element according to the present invention will be described below.

The light exposure apparatus includes a reduction projection exposure apparatus with an optical lens system, an one-to-one projection exposure with an optical lens system and the like.

The optical element is preferably used in a step-and-repeat type exposure apparatus employing a stepper, in which the entire surface of a wafer to be exposed is divided into fields, and exposure is performed from one field to one field. It is also preferably used in other types of exposure apparatus such as a mirror-scan type exposure apparatus.

Figure 12:
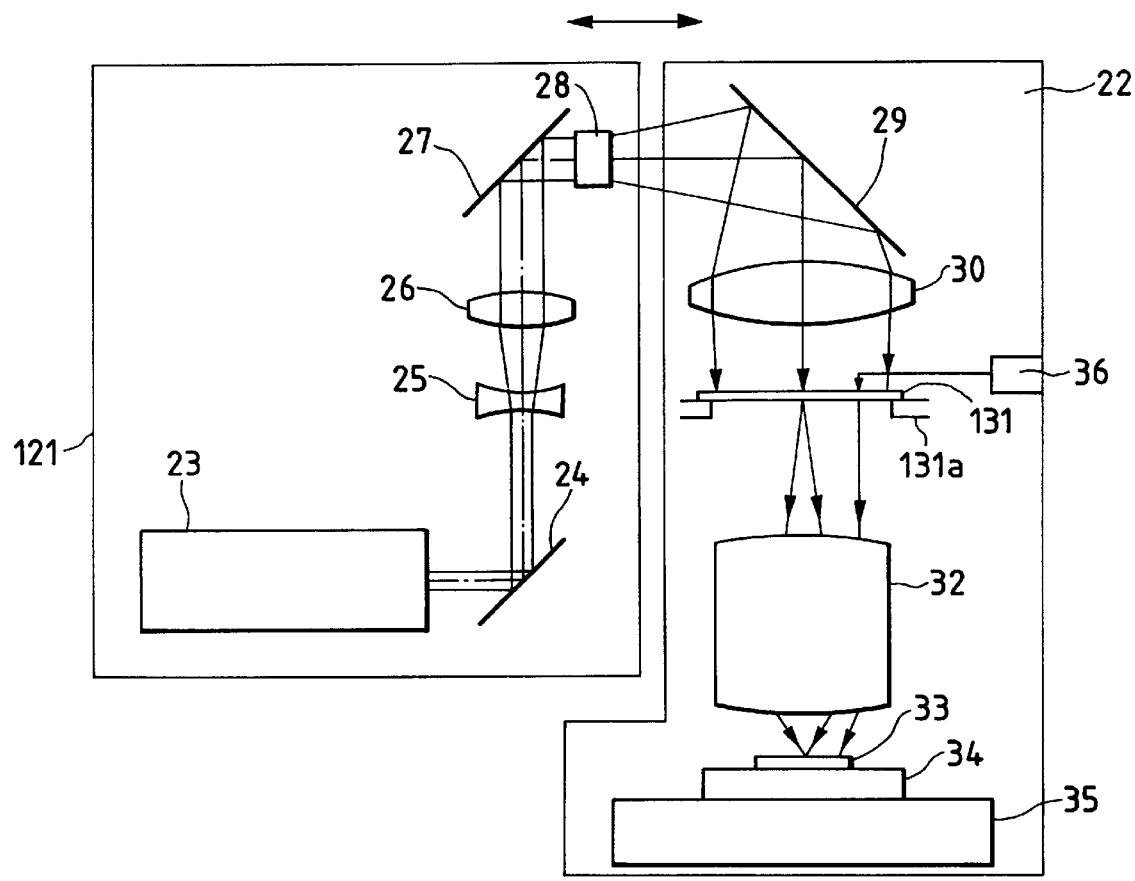
FIG. 12 is a light-exposure apparatus according to the present invention.

FIG. 12 is a schematic diagram illustrating the construction of the exposure apparatus according to the present invention. As shown in FIG. 12, the exposure apparatus comprises an illumination light source unit 121 and a light exposure unit 22. The illumination light source unit 121 and the light exposure unit 22 are constructed separately, that is, they are physically isolated from each other. The illumination light source unit 121 comprises an illumination light source 23 such as an excimer laser capable of outputting high optical power, a mirror 24, a concave lens 25, and a convex lens 26. The concave lens 25 and the convex lens 26 also serve as an beam expander for expanding the laser beam diameter to a size nearly equal to that of an optical integrator which will be described later. The illumination light source unit 121 further comprises a mirror 27, and the optical integrator 28 for uniformly illuminating a reticle. The illumination light source unit 121 totally comprises the laser 23, the mirror 24, the lens 25 and 26, the mirror 27 and the optical integrator 28. On the other hand, the light exposure unit 22 comprises a mirror 29, a condenser lens 30 for collimating a light beam emerging from the optical integrator 28, a reticle 131 on which a circuit pattern is formed, a reticle holder 131 a for holding the reticle 131 by means of sucking force, an optical projection system 32 for projecting the pattern of the reticle, a wafer 33 onto which the pattern of the reticle 131 is to be transferred via the optical projection lens 32, an XY stage for holding the wafer 33 thereon and moving it during a step-and-repeat exposure operation, a base plate 35 of the exposure apparatus, and alignment means 36 used in a TTL alignment process. In addition to the above, the exposure unit 22 further may include an automatic focusing system and a wafer carrying system.

Figure 13:
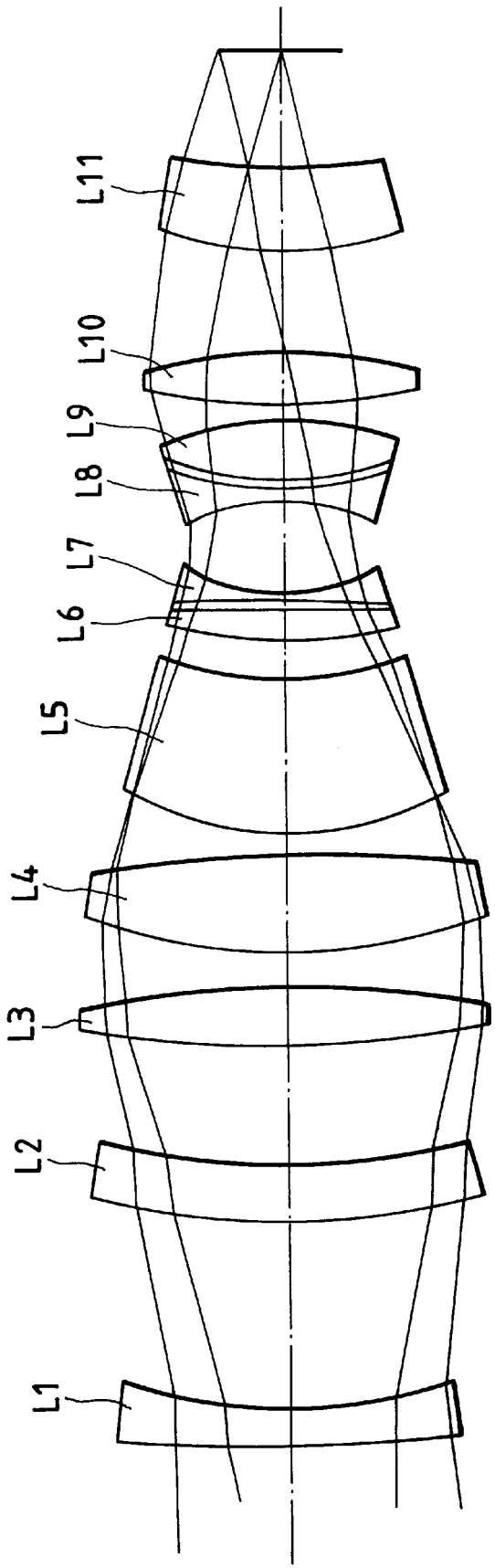
FIG. 13 is an optical system using an optical element according to the present invention.

FIG. 13 illustrates one example of optical elements for use in the exposure apparatus according to the present invention. More specifically, the optical elements shown in FIG. 13 are designed to serve as a lens assembly used in an optical projection system of the exposure apparatus shown in FIG. 12. The lens assembly is constructed with eleven lenses $L_1$ to $L_{11}$ which are located at separate positions.

What is claimed is:

1. An optical element comprising a plurality of films stacked on a substrate comprising a fluoride, wherein a film in contact with said substrate is a film comprising at least one selected from the group consisting of silicon oxide, beryllium oxide, magnesium oxide, and magnesium fluoride, and having a thickness of 30 nm or less.

2. An optical element according to claim 1, wherein said fluoride is calcium fluoride.

3. An optical element comprising a plurality of films stacked on a substrate comprising a fluoride, wherein a film in contact with said substrate is a film comprising at least one selected from the group consisting of silicon oxide, beryllium oxide, magnesium oxide, and magnesium fluoride, and having a thickness of 30 nm or less, and wherein said plurality of films not in contact with said substrate are aluminum oxide films or silicon oxide films.

4. An optical element according to claim 1, wherein the thickness of said film in contact with said substrate is 5 nm or more.

5. An optical element for use in a laser optical system of a wavelength of 250 nm or less, comprising a plurality of films stacked on a substrate comprising a fluoride, wherein a film in contact with said substrate is a film comprising at least one selected from the group consisting of silicon oxide, beryllium oxide, magnesium oxide, and magnesium fluoride, and having a thickness of 30 nm or less.

6. An optical element according to claim 5, wherein said fluoride is calcium fluoride.

7. An optical element for use in a laser optical system of a wavelength of 250 nm or less, comprising a plurality of films stacked on a substrate comprising a fluoride, wherein a film in contact with said substrate is a film comprising at least one selected from the group consisting of silicon oxide, beryllium oxide, magnesium oxide, and magnesium fluoride, and having a thickness of 30 nm or less, and wherein said plurality of films not in contact with said substrate are aluminum oxide films or silicon oxide films.

8. An optical element according to claim 5, wherein the thickness of said film in contact with said substrate is 5 nm or more.

9. An optical element according to claim 5, wherein said laser optical system is an optical system for an ArF excimer laser.

10. A light exposure apparatus comprising an illumination light source, a stage for mounting an object thereon, and an illumination light source system and/or an optical projection system comprising a plurality of optical elements each by forming a substrate stacked with a plurality of films, wherein a film of said optical element in contact with said substrate is a film comprising at least one selected from the group consisting of silicon oxide, beryllium oxide, magnesium oxide, and magnesium fluoride, and having a thickness of 30 nm or less.

11. A light exposure apparatus according to claim 10, wherein said fluoride is calcium fluoride.

12. A light exposure apparatus comprising an illumination light source, a stage for mounting an object thereon, and an illumination light source system and/or an optical projection system comprising a plurality of optical elements each by forming a substrate stacked with a plurality of films, wherein a film of said optical element in contact with said substrate is a film comprising at least one selected from the group consisting of silicon oxide, beryllium oxide, magnesium oxide, and magnesium fluoride, and having a thickness of 30 nm or less, and wherein said plurality of films not in contact with said substrate are aluminum oxide films or silicon oxide films.

13. A light exposure apparatus according to claim wherein the thickness of said film in contact with said substrate is 5 nm or more.

14. A light exposure apparatus according to claim 10, wherein said illumination light source is an excimer laser light source.

* * * * *

UNITED STATES PATENT AND TRADEMARK OFFICE
CERTIFICATE OF CORRECTION

PATENT NO.      : 6,261,696 B1
DATED           : July 17, 2001
INVENTOR(S)     : Ryuji Biro et al.

It is certified that error appears in the above-identified patent and that said Letters Patent is hereby corrected as shown below:

Drawings,
Sheet 4, Fig. 7, "CHARACTORISTICS" should read -- CHARACTERISTICS --.
Sheet 5, Fig. 8, "CHARACTORISTICS" should read -- CHARACTERISTICS --.

Column 6,
Line 11, "are" should read -- is --.

Column 10,
Line 47, "claim" should read -- claim 10, --

Signed and Sealed this

Second Day of April, 2002

Attest:

JAMES E. ROGAN
*Attesting Officer*    *Director of the United States Patent and Trademark Office*